(12) United States Patent
Jin et al.

(10) Patent No.: US 11,016,591 B2
(45) Date of Patent: May 25, 2021

(54) TOUCH-SENSITIVE DISPLAY DEVICE AND DISPLAY PANEL

(71) Applicant: LG DISPLAY CO., LTD., Seoul (KR)

(72) Inventors: Mokkyu Jin, Daegu (KR); DaeLim Park, Gumi-si (KR)

(73) Assignee: LG DISPLAY CO., LTD., Seoul (KR)

( * ) Notice: Subject to any disclaimer, the term of this patent is extended or adjusted under 35 U.S.C. 154(b) by 29 days.

(21) Appl. No.: 16/218,409

(22) Filed: Dec. 12, 2018

(65) Prior Publication Data

US 2019/0187852 A1   Jun. 20, 2019

(30) Foreign Application Priority Data

Dec. 14, 2017   (KR) .......................... 10-2017-0171997

(51) Int. Cl.
*G06F 3/041* (2006.01)
*G06F 3/044* (2006.01)
*G06F 3/047* (2006.01)

(52) U.S. Cl.
CPC ............ *G06F 3/0412* (2013.01); *G06F 3/044* (2013.01); *G06F 3/047* (2013.01); *G06F 3/0443* (2019.05); *G06F 3/0446* (2019.05); *G06F 2203/04103* (2013.01)

(58) Field of Classification Search
CPC ......... G06F 2203/04103; G06F 3/0412; G06F 3/044; G06F 3/0443; G06F 3/0446; G06F 3/047
See application file for complete search history.

(56) References Cited

U.S. PATENT DOCUMENTS

| 2014/0168537 | A1* | 6/2014 | Han | G06F 3/044 349/12 |
| 2015/0144915 | A1* | 5/2015 | Lee | H01L 22/32 257/40 |
| 2016/0004371 | A1* | 1/2016 | Kim | G06F 3/0418 345/173 |
| 2018/0061900 | A1* | 3/2018 | Hiraga | H01L 27/323 |
| 2018/0101044 | A1* | 4/2018 | Oka | G02F 1/1339 |

FOREIGN PATENT DOCUMENTS

| JP | 2016-014857 A | 1/2016 |
| JP | 2018-036761 A | 3/2018 |
| JP | 2018-060096 A | 4/2018 |
| JP | 2018-109768 A | 7/2018 |
| JP | 2018-120397 A | 8/2018 |
| JP | 2019-061242 A | 4/2019 |
| KR | 20110071681 | * 6/2011 |
| WO | 2017/213175 A1 | 12/2017 |

* cited by examiner

*Primary Examiner* — Kenneth Bukowski
(74) *Attorney, Agent, or Firm* — Polsinelli PC

(57) ABSTRACT

Various aspects of the present disclosure relate to a touch-sensitive display device and a display panel and, more specifically, to a touch-sensitive display device and a display panel in which a touch link line for electrically connecting a touch line disposed in an active area to a touch driving circuit disposed in a non-active area NA is disposed in the non-active area of the display panel, and having a link configuration in which the touch link line disposed in the non-active area is made of a different material from a touch line disposed in the active area and is disposed under a planarization layer. According to the link configuration of the disclosure, the touch link line can be prevented from being broken or damaged in the non-active area.

23 Claims, 14 Drawing Sheets

Material Layer Stack

LOA

TOUCH-SENSITIVE DISPLAY DEVICE AND DISPLAY PANEL

CROSS-REFERENCE TO RELATED APPLICATION

This application claims the priority benefit of Korean Patent Application No. 10-2017-0171997, filed on Dec. 14, 2017 in the Korean Intellectual Property Office, the disclosure of which is incorporated herein by reference in its entirety.

BACKGROUND

Field of the Disclosure

The present disclosure relates to a display device, and more particularly, to touch-sensitive display devices and touch-sensitive display panels. Although the present disclosure is suitable for a wide scope of applications, it is particularly suitable for preventing damage on touch sensing lines during a manufacturing process of the touch-sensitive display devices and touch-sensitive display panels.

Description of the Background

As the advent of information society, there has been increasing demands for various types of display devices for displaying images. Recently, a range of display devices, such as a liquid crystal display (LCD), a plasma display panel (PDP), an organic light emitting display (OLED) devices, or the like, have been developed and utilized.

A touch-sensitive display device of such display devices has been developed from typical input devices using a button, a keyboard, a mouse, or the like and has provided a touch-based input interface that enables a user to easily input information or a command intuitively and conveniently.

In order to provide a touch-based input interface by such a touch-sensitive display device, it is necessary to recognize a user's touch on a display panel and precisely detect a touch coordinate corresponding to the position of the touch on the display panel.

For this purpose, the touch-sensitive display device, as a touch sensor, may include a touch panel in which one or more touch electrodes are disposed, a touch driving circuit driving and sensing the touch panel, and the like. In addition, the touch panel can include one or more touch electrodes, and one or more touch lines electrically connecting the touch electrodes to the touch driving circuit.

Nowadays, a display panel in which a touch panel is incorporated has been fabricated for a slim display device and a simplified fabricating process.

For more accurately detecting a user's touch, one or more touch electrodes can be located on an upper portion of the display panel. Accordingly, one or more touch lines electrically connecting the touch electrodes disposed in an active area on which an image is displayed to a touch driving circuit disposed in a non-active area located in an outer area of the active area extend from the active area to the non-active area and are located on an upper portion of the display panel.

Since the touch lines are located at an upper part of the non-active area of the display panel, there is a problem that the touch lines can be broken or damaged during a scribing process to be performed when the display panel is fabricated.

SUMMARY

Accordingly, the present disclosure to provide a display device and a display panel having a wiring configuration (wiring structure) capable of preventing a wired line related to touching sensing from being broken or damaged.

In addition, the present disclosure to provide a display device and a display panel, in which a touch link line for electrically connecting a touch line disposed in an active area to a touch driving circuit disposed in a non-active area is disposed in the non-active area, have a link configuration (link structure) capable of preventing the touch link line from being broken or damaged in the non-active area.

Further, the present disclosure to provide a display device and a display panel having a stacked structure capable of preventing defects of signal lines used for data driving and touch driving (touch sensing) in spite of the limitations on the types of wiring materials.

According to an aspect consistent with various aspects, provided is a display device including a display panel in which disposed are a plurality of data lines, a plurality of gate lines, a plurality of touch electrodes and a plurality of touch lines electrically connected to the touch electrodes, a data driving circuit driving the data lines, and a touch driving circuit driving the touch electrodes.

In such a display device, the display panel may include an active area and a non-active area which is an outer area of the active area.

A plurality of data lines, a plurality of gate lines, a plurality of touch electrodes and a plurality of touch lines may be disposed in the active area.

A plurality of data link lines electrically connecting a plurality of data lines to the data driving circuit and a plurality of touch link lines electrically connecting a plurality of touch lines to the touch driving circuit may be disposed in the non-active area.

The touch lines and the touch link lines may be made of different materials from each other.

A plurality of touch lines may be disposed on a planarization layer, and a plurality of touch link lines may be disposed beneath the planarization layer.

The touch link lines and the data lines may be made of the same material.

The plurality of data lines and the plurality of touch lines, which are located in the active area, may be made of different materials from each other.

The plurality of data link lines and the plurality of touch link lines, which are located in the non-active area, may be made of different materials from each other.

The display panel may include a first conductive material layer made of a first conductive material, a second conductive material layer made of a second conductive material and a third conductive material layer made of a third conductive material, and the first, second and third conductive materials may be different from one another.

The planarization layer may be located on the first conductive material layer and the second conductive material layer, and beneath the third conductive material layer.

A plurality of touch electrodes may be located on the planarization layer.

A plurality of data link lines, a plurality of data lines, a plurality of touch lines and a plurality of touch link lines may be made of the first conductive material, the second conductive, the third conductive material and the second conductive material respectively.

According to another aspect consistent with various aspects, provided is a display device comprising a first substrate including an active area displaying an image and a non-active area which is an outer area of the active area, and a second substrate facing the first substrate, a plurality of gate lines and a plurality of data lines which define at least one pixel by intersecting each other on the first substrate, a plurality of touch electrodes overlapped with the at least one pixel in the active area on the first substrate and a plurality of touch lines electrically connected to the plurality of touch electrodes, a data driving circuit disposed in or electrically connected to the non-active area on the first substrate and driving the plurality of data lines and a touch driving circuit driving the plurality of touch electrodes, a plurality of data link lines disposed in the non-active area on the first substrate and electrically connecting the plurality of data lines to the data driving circuit, and a plurality of touch link lines disposed in the non-active area on the first substrate and electrically connecting the plurality of touch lines to the touch driving circuit, wherein the plurality of touch lines and the plurality of touch link lines are made of different materials from each other and disposed in different layers from each other.

According to another aspect consistent with various aspects, provided is a display panel including a plurality of data lines disposed in an active area, a plurality of touch electrodes disposed in the active area, a plurality of touch lines disposed in the active area and electrically connected to the touch electrodes, a plurality of data link lines disposed in a non-active area which is an outer area of the active area and electrically connected to the data lines, and a plurality of touch link lines disposed in the non-active area and electrically connected to the touch lines.

In such a display panel, the touch lines and the touch link lines may be made of different materials from each other.

A plurality of touch lines may be disposed on a planarization layer, and a plurality of touch link lines may be disposed beneath the planarization layer.

According to another aspect consistent with various aspects, provided is a display device including a first substrate and a second substrate facing to the first substrate.

The first substrate may extend beyond the second substrate.

A plurality of touch electrodes to which a touch driving signal is applied, and a plurality of touch lines electrically connected to the touch electrode may be disposed in an active area of the first substrate.

A plurality of touch link lines electrically connecting the touch lines to a touch pad may be disposed in a non-active area which is an outer area of the active area of the first substrate.

The touch link line and the touch line may be made of different materials from each other.

A planarization layer may be located on the first substrate, the touch line may be located on the planarization layer in the active area, and the touch link line may be located beneath the planarization layer in the non-active area.

The touch link line may be, for example, a source-drain material.

According to yet another aspect consistent with various aspects, provided is a display device including a first substrate having an active area displaying an image and a non-active area which is an outer area of the active area and a second substrate facing the first substrate, a plurality of gate lines and a plurality of data lines which define at least one pixel by intersecting each other on the first substrate, a plurality of touch electrodes overlapped with the at least one pixel in the active area on the first substrate and a plurality of touch lines electrically connected to the touch electrodes, and a data driving circuit disposed in or electrically connected to the non-active area on the first substrate and driving the data lines and a touch driving circuit driving the touch electrodes.

The display device may further include a plurality of data link lines disposed in the non-active area on the first substrate and electrically connecting a plurality of data lines to the data driving circuit, and a plurality of touch link lines disposed in the non-active area on the first substrate and electrically connecting a plurality of touch lines to the touch driving circuit.

The touch lines and the touch link lines may be made of different materials from each other and/or disposed on different layers from each other.

In the display device, a plurality of data lines and a plurality of touch link lines may be located on a plurality of gate lines and a plurality of data link lines, and a plurality of touch lines may be located on the data lines and the touch link lines.

The display device may further include a planarization layer disposed between a plurality of touch lines and a plurality of data lines or a plurality of touch lines and a plurality of touch link lines.

According to the various aspects of the present disclosure, provided are a display device and a display panel having a wiring configuration (wiring structure) capable of preventing wired lines related to the touching sensing from being broken or damaged.

According to the various aspects of the present disclosure, provided are a display device and a display panel, in which a touch link line for electrically connecting a touch line disposed in an active area to a touch driving circuit disposed in a non-active area is disposed in the non-active area, have a link configuration (link structure) capable of preventing the touch link line from being broken or damaged in the non-active area.

According to the various aspects of the present disclosure, provided are a display device and a display panel having a stacked structure capable of preventing defects of signal lines used for data driving and touch driving (touch sensing) in spite of the limitations on the types of wiring materials.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings.

DETAILED DESCRIPTION

Figure 1:
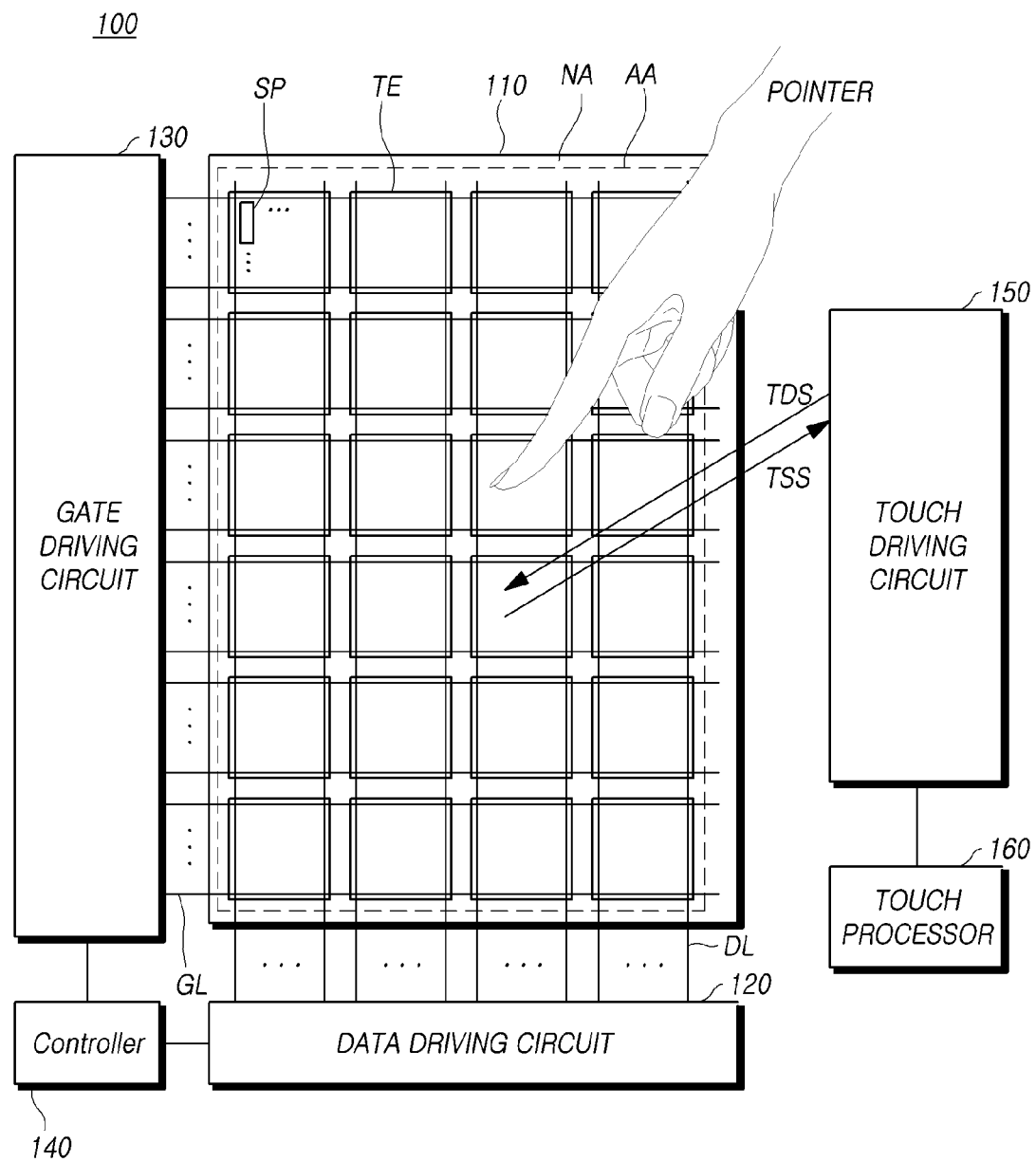
FIG. 1 is a block diagram schematically illustrating a touch-sensitive display device according to aspects of the present disclosure.

Hereinafter, the aspects of the present disclosure will be described in detail with reference to the accompanying drawings. In denoting elements of the drawings by reference numerals, the same elements will be referenced by the same reference numerals although the elements are illustrated in different drawings. In the following description of the disclosure, detailed description of known functions and configurations incorporated herein may be omitted when it may make the subject matter of the disclosure rather unclear.

Terms, such as first, second, A, B, (a), or (b) may be used herein to describe elements of the disclosure. Each of the terms is not used to define essence, order, sequence, or number of an element, but is used merely to distinguish the corresponding element from another element. When it is mentioned that an element is "connected" or "coupled" to another element, it should be interpreted that another element may be "interposed" between the elements or the elements may be "connected" or "coupled" to each other via another element as well as that one element is directly connected or coupled to another element.

FIG. 1 is a block diagram schematically illustrating a touch-sensitive display device according to aspects of the present disclosure.

A touch-sensitive display device 100 as a display device according to an aspect of the present disclosure may provide a display function of displaying an image (display function) and a touch sensing function of detecting touches by a pointer, such as a finger, a pen, or the like (touch sensing function).

The touch-sensitive display device 100 according to an aspect of the present disclosure, to provide the display function, includes a display panel 110 in which a plurality of data lines DL and a plurality of gate lines GL are disposed, a data driving circuit 120 driving the data lines DL, a gate driving circuit 130 driving the gate lines GL, a controller 140 controlling the driving operations of the data driving circuit 120 and the gate driving circuit 130, and the like.

A plurality of subpixels SP which can be defined by a plurality of data lines DL and a plurality of data lines GL may be arranged in a display panel 110. The display panel 110 includes an active area AA in which an image is displayed and a non-active area NA which is an outside area of the active area.

The data driving circuit 120 may supply a data voltage to a plurality of data lines DL. The gate driving circuit 130 may supply sequentially a gate signal (a scan signal) to a plurality of gate lines GL.

The controller 140 may output a control signal to the data driving circuit 120 and the gate driving circuit 130, in order to control the driving operations of the data driving circuit 120 and the gate driving circuit 130. In addition, the controller 140 may supply image data to the data driving circuit 120.

The touch-sensitive display device 100 according to aspects of the present disclosure may detect touches by using either self-capacitance touch sensing or mutual-capacitance touch sensing.

Hereinafter, for convenience of description, description will be given assuming that the touch-sensitive display device 100 according to aspects of the present disclosure may detect a touch event by using the self-capacitance touch sensing, and, likewise, a plurality of touch electrodes TE are disposed on a display panel 110 by the self-capacitance detection configuration.

In order to perform a touch sensing function, the touch-sensitive display device 100 according to aspects of the present disclosure may include a plurality of touch electrodes TE, a touch driving circuit 150 driving at least one touch electrode TE, a touch processor 160 determining whether a touch event is occurred or not and/or a touch location, and the like.

A plurality of touch electrodes TE corresponds to a touch sensor and may be integrated into the display panel 110. That is, the display panel 110 may be a touch panel integrated display panel.

A plurality of electrodes TE may be disposed in an active area AA of the display panel 110. In some cases, a plurality of touch electrodes located at the outermost area of the touch electrodes TE may extend to a non-active area NA of the display panel 110 or may be located in the non-active area NA.

In order to drive a plurality of touch electrodes TE, the touch driving circuit 150 is configured to supply a touch driving signal TDS to the touch electrodes TE and receive a touch sensing signal TSS from each touch electrode TE.

The touch driving circuit 150 may provide sensing data generated based on the received touch sensing signal TSS to a touch processor 160.

The touch processor 160 may implement a touch algorithm (processing of touch sensing) by using the sensing data, and thus determine whether a touch event is occurred or not, or a touch location in a case where the touch event has occurred.

A single touch electrode TE may have a size greater than a single subpixel SP. That is, the size of one touch electrode TE may correspond to or greater than that of an area occupied by a plurality of subpixels SP. For example, the size of one touch electrode TE (a unit touch electrode) may be several times to several hundred times larger than that of one subpixel SP.

The ratio of the size of the touch electrode to the size of the subpixel may be adjusted by considering totality of the circumstances such as efficiency, performance of touch sensing, and a display effect caused by touch sensing.

In addition, one touch electrode TE may be an electrode without an opening (an open area), or an electrode with at least one opening (e.g., a mesh-type electrode).

Figure 2:
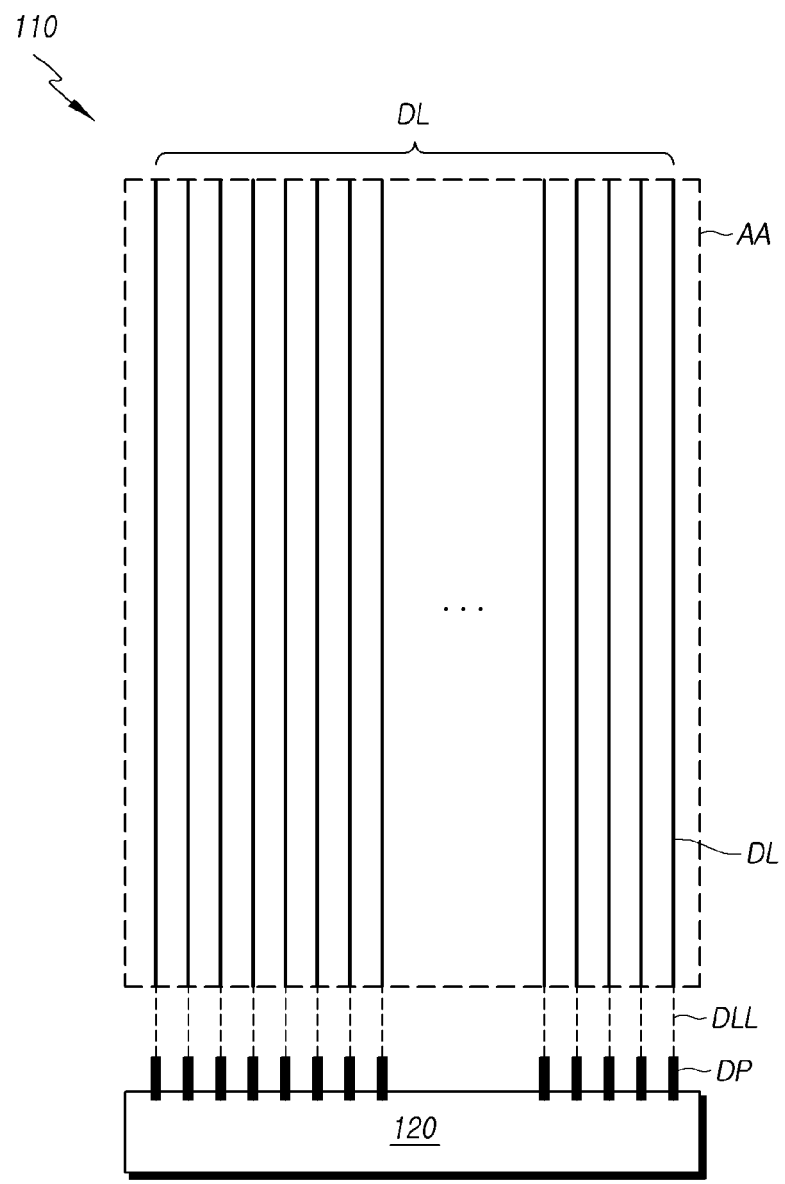
FIG. 2 is a view illustrating a data driving configuration (data driving structure) of the touch-sensitive display device according to aspects of the present disclosure.

FIG. 2 is a view illustrating a data driving configuration (data driving structure) of the touch-sensitive display device 100 according to aspects of the present disclosure.

Referring to FIG. 2, the display panel 110 has a data signal transfer structure (data signal transfer mechanism), for data driving, which includes a plurality of data lines DL, a plurality of data link lines DLL, a plurality of data pads DP, and the like.

The data driving circuit 120 is configured to supply a data signal (data voltage) to the data signal transfer structure.

A data signal (data voltage) output by the data driving circuit 120 may be finally applied to a specific electrode, such as a pixel electrode, a gate electrode of a driving transistor, or the like, by passing through a plurality of data pads DP, a plurality of data link lines DLL and a plurality of data lines DL, and then a plurality of transistors in a plurality of subpixels SP.

According to aspects of an arrangement of the data signal transfer structure in the display panel 110, a plurality of data lines DL may be disposed in the active area AA of the display panel 110. In some cases, a plurality of data lines DL may extend to the non-active area NA.

A plurality of data pads DP are disposed in the non-active area NA of the display panel and, as a type of electrode, are electrically connected to the data driving circuit 120. A plurality of data pads DP may be directly connected to the data driving circuit 120 or a printed circuit on which the data driving circuit 120 is mounted.

A plurality of data link lines DLL may be disposed in the non-active area NA of the display panel 110. One end of a plurality of data link lines DLL may be electrically connected to a plurality of data lines DL disposed in the active area AA, or the other end thereof may be electrically connected to a plurality of data pads DP.

Figure 3:
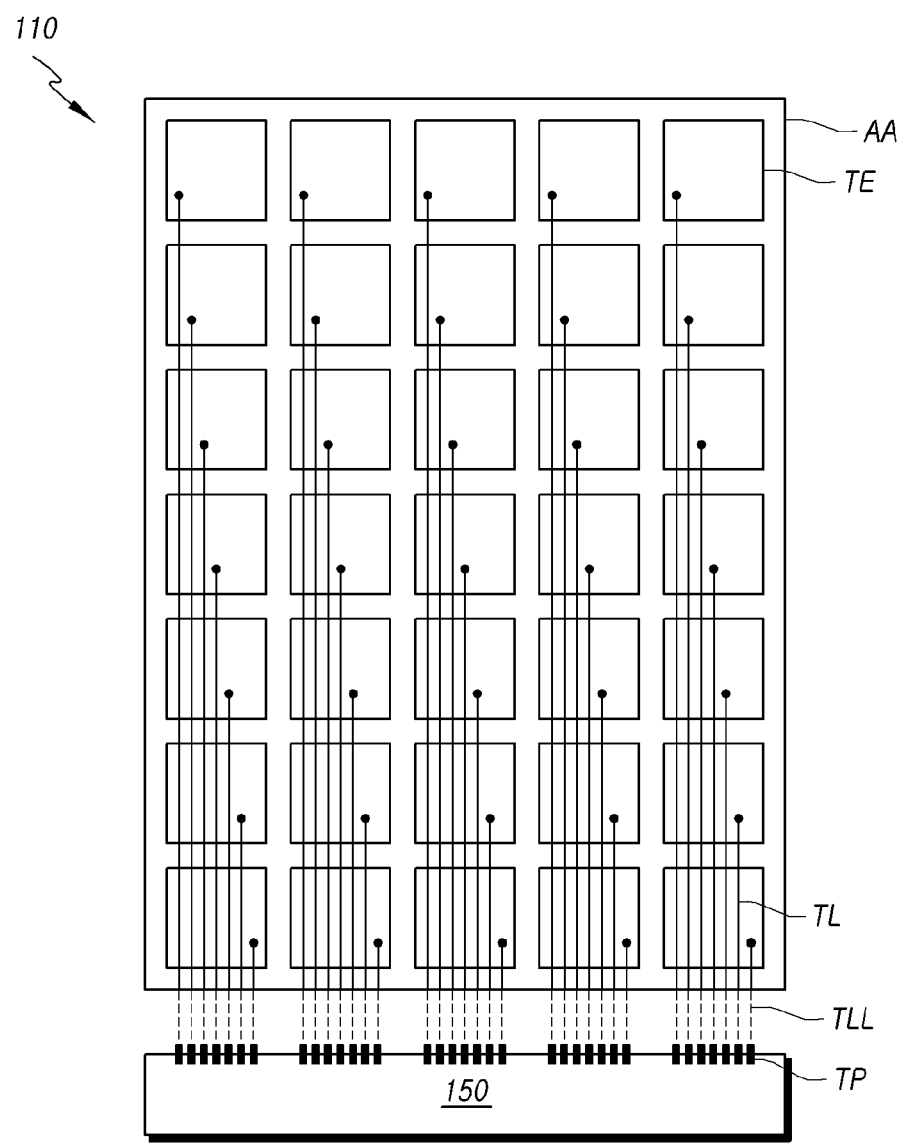
FIG. 3 is a view illustrating a touch driving configuration (touch driving structure) of the touch-sensitive display device according to aspects of the present disclosure.
Figure 4:
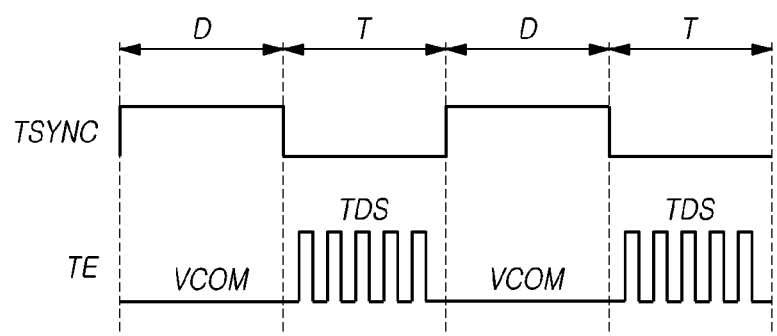
FIG. 4 is a timing chart illustrating exemplary drive timings of the touch-sensitive display device according to aspects of the present disclosure.

FIG. 3 is a view illustrating a touch driving configuration (touch sensing configuration) of the touch-sensitive display device 100 according to aspects of the present disclosure. FIG. 4 is a timing chart illustrating exemplary drive timings of the touch-sensitive display device 100 according to aspects of the present disclosure.

Referring to FIG. 3, for touch driving (touch sensing), the display panel 110 has a touch signal transfer structure which includes a plurality of touch electrodes TE, a plurality of touch lines TL, a plurality of touch link lines TLL, a plurality of touch pads TP, and the like.

The touch driving circuit 150 may transmit or receive a touch signal, such as a touch driving signal, a touch sending signal, or the like to or from the display panel 110 through the touch signal transfer structure.

A touch driving signal TDS of touch signals output by the touch driving circuit 150 may be finally applied to a plurality of touch electrodes TE by passing through a plurality of touch pads TP, a plurality of touch link lines TLL, and a plurality of touch lines TL.

The touch driving circuit 150, depending on an occurrence of a touch event or depending on electrical characteristics varying at touch electrodes TE, may detect a touch sensing signal TSS caused by variances of electrical characteristics in the touch electrodes TE, such as a capacitance variance, through a plurality of touch lines TL, a plurality of touch link lines TLL and a plurality of touch pads TP.

According to aspects on an arrangement of the touch signal transfer structure in the display panel 110, a plurality of touch electrodes TE may be disposed in an active area AA of the display panel 110. In some cases, a part of one touch electrode or one touch electrode of a plurality of touch electrodes may extend to a non-active area NA or may be disposed in the non-active area NA. A plurality of touch lines TL may be connected to each of the touch electrodes TE.

A plurality of touch electrodes TE may be disposed in the active area AA of the display panel 110. In some cases, a plurality of touch lines TL may extend to the non-active area NA.

A plurality of touch pads TP are disposed in the non-active area NA of the display panel and, as a type of electrode, are electrically connected to the touch driving circuit 150. A plurality of touch pads TP may be directly connected to the touch driving circuit 150 or a printed circuit on which the touch driving circuit 150 is mounted.

A plurality of touch link lines TLL may be disposed in the non-active area NA of the display panel 110. One end of a plurality of data link lines DLL may be electrically connected to a plurality of touch lines TL disposed in the active area AA, or the other end thereof may be electrically connected to a plurality of touch pads TP.

A plurality of touch electrodes TE disposed in the display panel 110 may be a dedicated touch sensor for touch sensing, but, in some cases, may be a common electrode used for display driving.

For example, a plurality of touch electrodes TE may be a common electrode such that a common voltage Vcom is applied thereto for display driving, and a touch driving signal TDS is applied thereto for touch driving.

The display driving and touch driving may be performed either by time sharing or simultaneously.

When the display driving and the touch driving are performed by time sharing, a display driving period D and a touch driving period T may be defined by a synchronization signal TSYNC.

Referring to FIG. 4, when a plurality of touch electrodes TE is utilized in both the display driving and touch driving, a common voltage Vcom which may be DC voltage is applied to a plurality of touch electrodes TE during a display driving period D, and a touch driving signal TDS which may be a pulse signal or a modulated signal is applied to the whole or a part of a plurality of touch electrodes TE, during a touch driving period T.

Figure 5:
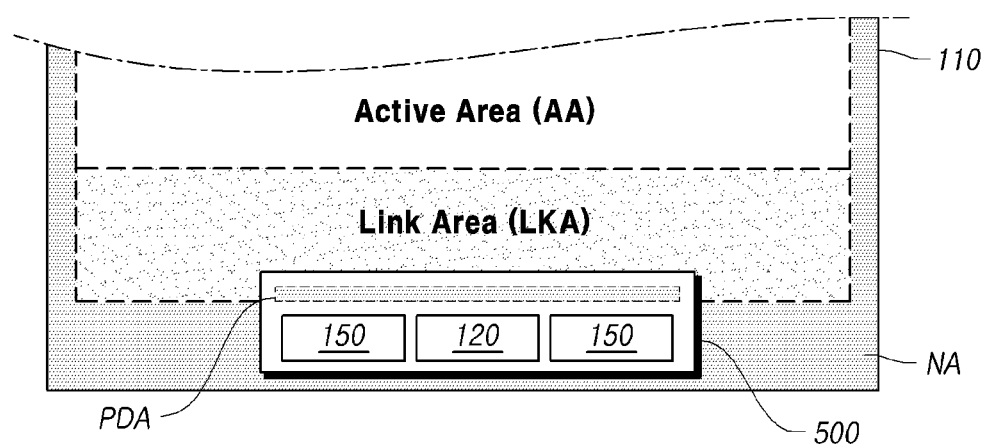
FIG. 5 is a view illustrating a part of a non-active area in the touch-sensitive display device according to aspects of the present disclosure.
Figure 6:
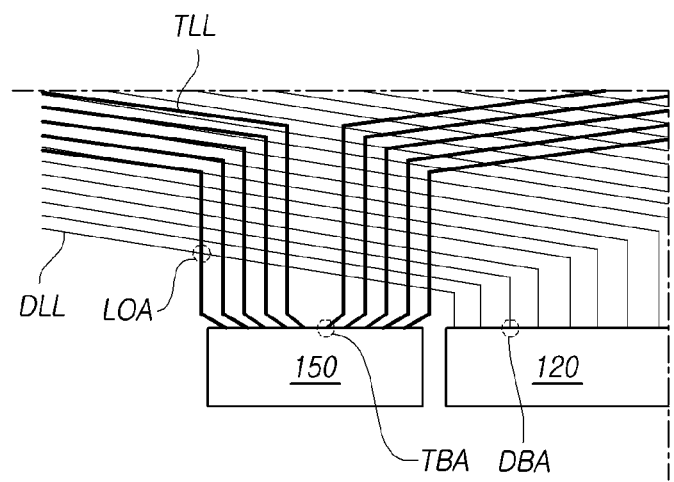
FIG. 6 is a view illustrating a plurality of data link lines and a plurality of touch link lines which are disposed in a link area of the non-active area in the touch-sensitive display device according to aspects of the present disclosure.

FIG. 5 is a view illustrating a part of a non-active area NA in the touch-sensitive display device 100 according to aspects of the present disclosure. FIG. 6 is a view illustrating a plurality of data link lines DLL and a plurality of touch link lines TLL which are disposed in a link area LKA of the non-active area NA in the touch-sensitive display device 100 according to aspects of the present disclosure.

Referring to FIG. 5, a plurality of data lines DL, a plurality of gate lines GL, a plurality of touch electrodes TE, a plurality of touch lines TL, and the like may be disposed in an active area AA of the display panel 110, The non-active area NA of the display panel 110 may include a pad area PDA and a link area LKA.

A plurality of data pads DP to which the data driving circuit 120 is electrically connected and a plurality of touch pads TP to which the touch driving circuit 120 is electrically connected may be disposed in the pad area PDA.

A plurality of data link lines DLL which electrically connect a plurality of data lines DL to a plurality of data pads DP such that each of the data lines DL corresponds to each of the data pads DP and a plurality of touch link lines TLL which electrically connect a plurality of touch lines TL to a plurality of touch pads TP such that each of the touch lines TL corresponds to each of the touch pads TP may be disposed in the link area LKA.

Each of the data driving circuit 120 and the touch driving circuit 150 may be implemented with at least one integrated circuit IC. Each of the data driving circuit 120 and the touch driving circuit 150 may be implemented in a type of tape carrier package (TCP), a type of chip on film (COF), or a type of chip on glass (COG), or the like.

Alternatively, as illustrated in FIG. 5, the data driving circuit 120 and the touch driving circuit 150 may be integrated and included in an integrated circuit 500. As illustrated in FIG. 5, such an integrated circuit 500 may be implemented by the COG type, the TCP type, the COF type, or the like.

As described above, by integrating the data driving circuit 120 and the touch driving circuit 150 into the integrated circuit 500, the number of components of the integrated circuit (IC) can be reduced, and a plurality of data lines DL and a plurality of touch lines TL can be effectively driven, which are arranged in the same direction in the active area AA.

As illustrated in FIG. 6, a plurality of data link lines DLL and a plurality of touch link lines TLL may partially overlap each other in the link area LKA in the non-active area NA of the display panel 110.

Since the data link lines DLL and the touch link lines TLL are separated electrically from each other, the data link lines DLL and the touch link lines TLL are placed on different layers between which an insulating layer is located.

The data link lines DLL and the touch link lines TLL may be made of different conductive materials from each other.

In FIG. 6, an LOA area is an area where a plurality of data link lines DLL and a plurality of touch link lines TLL overlap each other, and a cross-sectional structure in the LOA area will be described later with reference to FIG. 10. In FIG. 6, a TBA area is an area where the touch driving circuit 150 and the touch link lines TLL are connected to each other, and a cross-sectional structure in the TBA area will be described later with reference to FIG. 12. In FIG. 6, a DBA area is an area where the data driving circuit 120 and the data link lines DLL are connected to each other, and a cross-sectional structure in the DBA area will be described later with reference to FIG. 13.

Figure 7:
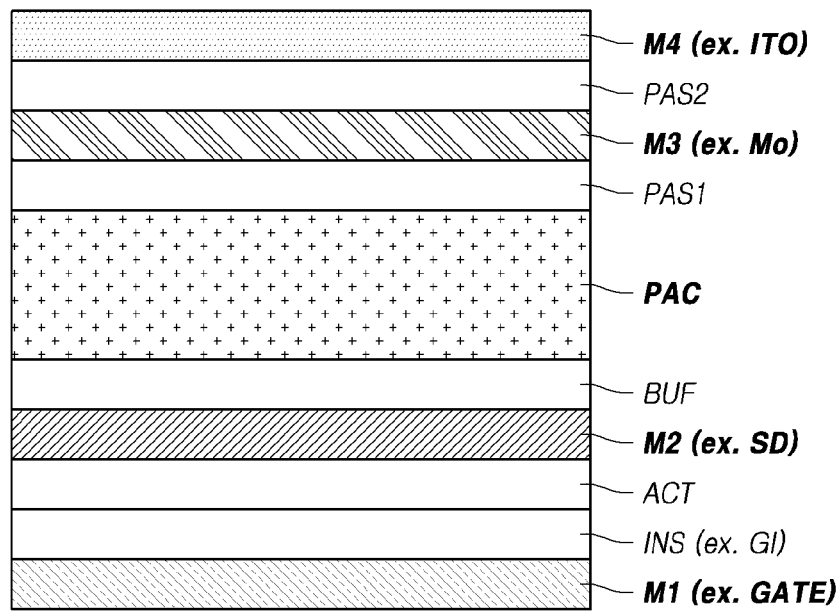
FIG. 7 is a view illustrating a material layer stack in a display panel of the touch-sensitive display device according to aspects of the present disclosure.

FIG. 7 is a view illustrating a material layer stack structure in the display panel 110 of the touch-sensitive display device 100 according to aspects of the present disclosure.

Referring to FIG. 7, the display panel 110 may include multiple layers having several materials.

The display panel 110 may include a first conductive material layer M1 of a first conductive material, a second conductive material layer M2 of a second conductive material, a third conductive material layer M3 of a third conductive material, and the like.

The first, second and third conductive materials may be different materials from one another. For example, the first, second and third conductive materials may be a gate material GATE, source-drain material SD, and molybdenum Mo metal respectively.

In this case, the gate material GATE may be used for a gate line or a gate electrode of a transistor. The source-drain material SD can be used for various signal lines, such as data lines, a source electrode and a drain electrode of a transistor, or the like.

The first and second conductive material layers M1 and M2 may be located beneath a planarization layer PAC, and the third conductive material layer M3 may be located on the planarization layer PAC.

That is, the planarization layer PAC may be located on the first and second conductive material layers M1 and M2, and beneath the third conductive material layer M3.

A plurality of touch electrodes may be located on the planarization layer PAC.

As described above, since a touch electrode TE influenced by a user's touch is disposed on the planarization layer PAC, touch sensitivity can be improved.

The display panel 110 may further include a fourth conductive material layer M4 of a fourth conductive material in addition to the first, second, and third conductive material layers M1 to M3.

The fourth conductive material may be different from the first to third conductive materials. For example, the fourth conductive material may be a transparent electrode material such as indium tin oxide (ITO).

The first to fourth conductive material layers M1 to M4 may be located on respective layers between which at least one insulating layer, such as INS, BUF, PAC, PAS1, PAS2, or the like, is located, and may be electrically connected to one another at least one point.

A stacking order of the first to fourth conductive material layers M1 to M4 will be discussed.

The first conductive material layer M1 of the first to fourth conductive material layers M1 to M4 is located at the bottom.

The second conductive material layer M2 may be located on the first conductive material layer M1.

The first and second conductive material layers M1 and M2 are electrically insulated by an insulating layer INS, such as a gate insulating film GI.

An active layer ACT may be located on the second conductive material layer M2.

The second conductive material layer M2 may be located on the active layer ACT.

A buffer layer BUF may be located on the second conductive material layer M2.

A planarization layer PAC may be located on the buffer layer BUF.

First and second protective layers PAS1 and PAS2 may be located on the planarization layer PAC.

The third conductive material layer M3 may be located between the first protective layer PAS1 and the second protective layer PAS2.

The fourth conductive material layer M4 may be located on the second protective layer PAS2.

Figure 8:
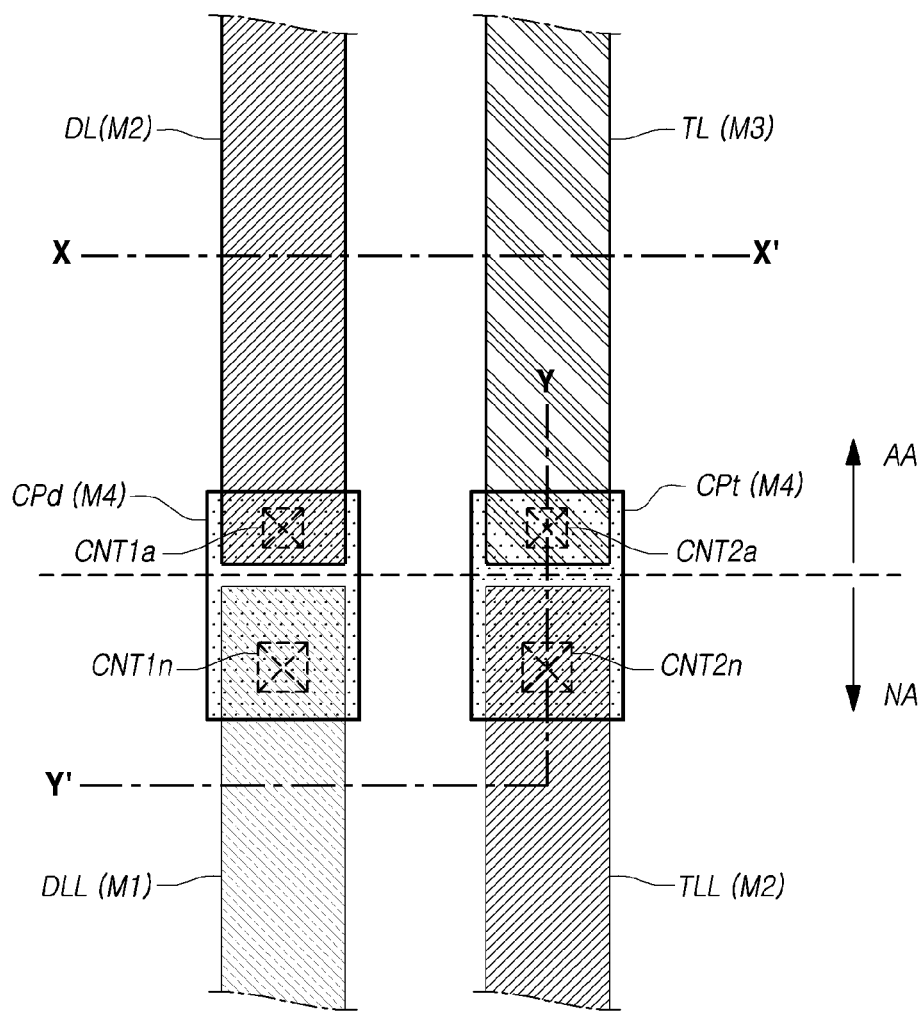
FIG. 8 is a plan view illustrating signal lines related to data driving and touch driving of the touch-sensitive display device according to aspects of the present disclosure.

FIG. 8 is a plan view illustrating signal lines such as DL, DLL, TL, TLL related to data driving and touch driving of the touch-sensitive display device 100 according to aspects of the present disclosure.

Referring to FIG. 8, a plurality of data lines DL may be made of the second conductive material. A plurality of data link lines DLL may be made of the first conductive material. A plurality of touch lines TL may be made of the third conductive material. A plurality of touch link lines TLL may be made of the second conductive material.

In view of an active area AA and a non-active area NA, touch-sensitive display device 100 and the display panel 110 will be discussed below.

In the active area AA, a plurality of data lines DL may be located in the second conductive material layer M2. A plurality of touch lines TL may be located in the third conductive material layer M3.

In the non-active area NA, a plurality of data link lines DLL may be located in the first conductive material layer M1. A plurality of touch link lines TLL may be located in the second conductive material layer M2.

According to the above-described structures and/or configurations, it is possible to prevent a short-circuit between the data lines DL and the touch lines TL in the active area AA and a short-circuit between the data link lines DLL and the touch link lines TLL in non-active area NA.

Referring to FIG. 8, a plurality of data lines DL located in the second conductive material layer M2 in the active area AA and a plurality of data link lines DLL located in the first conductive material layer M1 in the non-active area NA may be connected to each other, for example, through a data-side connection pattern CPd located in the fourth conductive material layer M4. In this case, for example, the data-side connection pattern CPd may overlap both the active area AA and the non-active area NA.

As a more specific example, a plurality of data lines DL located in the second conductive material layer M2 in the active area AA may be connected to a part of the data-side connection pattern CPd through a contact hole CNT1a, and a plurality of data link lines DLL located in the first conductive material layer M1 in the non-active area NA may be connected to another part of the data-side connection pattern CPd through another contact hole CNT1n. Thus, a plurality of data lines DL located in the second conductive material layer M2 in the active area AA and a plurality of data link lines DLL located in the first conductive material layer M1 in the non-active area NA may be electrically connected to each other.

A plurality of touch lines TL located in the third conductive material layer M3 in the active area AA and a plurality of touch link lines TLL located in the second conductive material layer M2 in the non-active area NA may be connected to each other, for example, through a touch-side connection pattern CPt located in the fourth conductive material layer M4. In this case, for example, the touch-side connection pattern CPt may overlap both the active area AA and the non-active area NA.

As a more specific example, referring to FIG. 8, a plurality of touch lines TL located in the third conductive material layer M3 in the active area AA may be connected to a part of the touch-side connection pattern CPt through a contact hole CNT2a, and a plurality of touch link lines TLL located in the second conductive material layer M2 in the non-active area NA may be connected to another part of the touch-side connection pattern CPt through another contact hole CNT2n. Thus, a plurality of touch lines TL located in the third conductive material layer M3 in the active area AA and a plurality of touch link lines TLL located in the second conductive material layer M2 in the non-active area NA may be electrically connected to each other.

A cross-sectional structure of an area taken along X-X' line and a cross-sectional structure of an area taken along Y-Y' line in FIG. 8, will be described later with reference to FIGS. 9 and 11.

Figure 9:
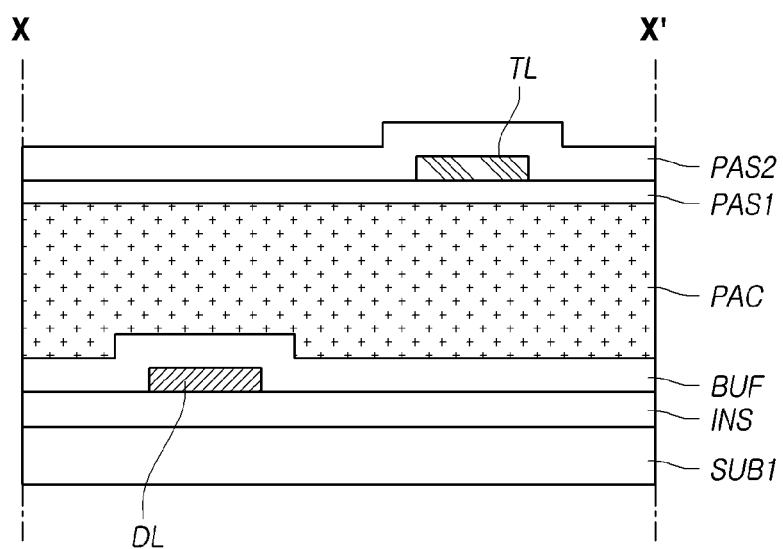
FIGS. 9 to 11 are cross-sectional views of the signal lines related to data driving and touch driving of the touch-sensitive display device according to aspects of the present disclosure.
Figure 10:
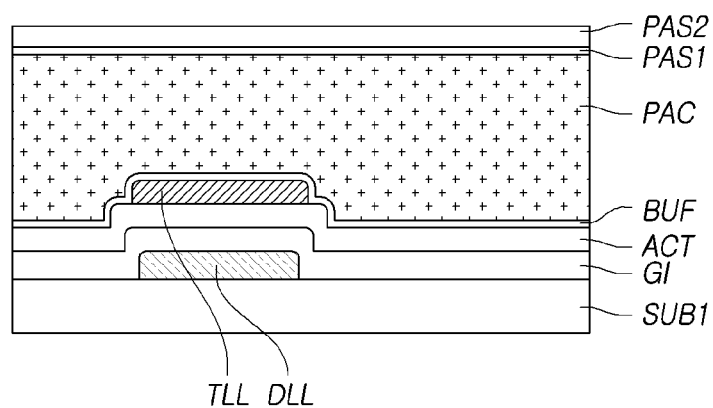
Figure 11:
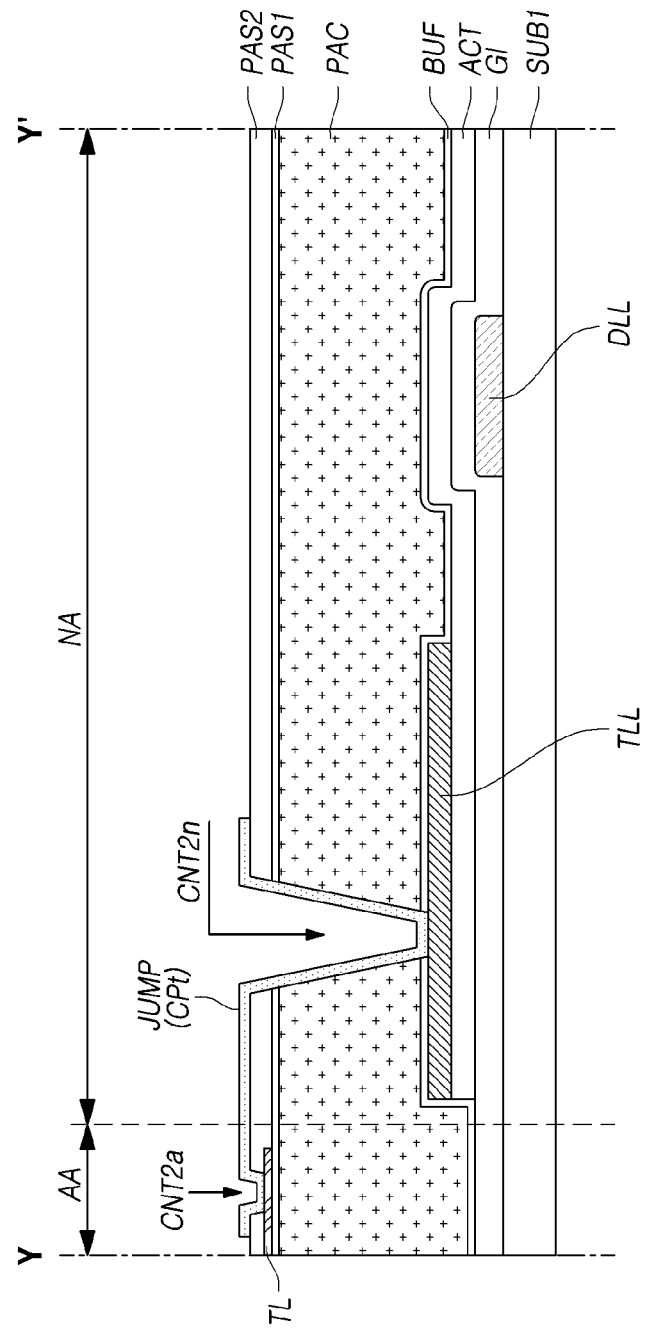

FIGS. 9 to 11 are cross-sectional views of the display panel 110 of the touch-sensitive display device 100 according to aspects of the present disclosure and cross-sectional views illustrating signal lines for data driving and touch driving, such as DL, DLL, TL, TLL, or the like. FIG. 9 is a schematic cross-sectional view of an area taken along X-X' line of FIG. 8. FIG. 10 is a schematic cross-sectional view on an LOA area of FIG. 6. FIG. 11 is a schematic cross-sectional view of an area taken along Y-Y' line of FIG. 8.

Referring to FIG. 9, locations of the data line DL and the touch line TL, that are layers, in an active area AA of the display panel 110, can be identified.

Referring to FIG. 9, a plurality of data lines DL and a plurality of touch lines TL in the active area AA may be made of different materials from each other. That is to say, a plurality of data lines DL and a plurality of touch lines TL in the active area AA may be located in different material layers from each other.

Exemplary aspects will be described with reference to FIG. 9.

An insulating layer INS is located on a first substrate SUB1, and a second conductive material layer M2 is located on the insulating layer INS. In this case, the data line DL may be disposed in the second conductive material layer M2.

A buffer layer BUF may be located on the second conductive material layer M2, and a planarization layer PAC may be located on the buffer layer BUF.

A first protective layer PAS1 may be located on the planarization layer PAC, and a third conductive material layer M3 may be located on the first protective layer PAS1. The third conductive material layer M3 located on the first protective layer PAS1 is covered with a second protective layer PAS2. In this case, the touch line TL may be disposed in the third conductive material layer M3.

The data lines DL and the touch lines TL in the active area AA are electrically insulated from each other. As an aspect, the data lines DL and the touch lines TL may vertically overlap each other in the active area AA.

Accordingly, as described above, by disposing the data lines DL and the touch lines TL in the active area AA in different layers from each other, a short-circuit can be prevented between the data lines DL and the touch lines TL in the active area AA.

Referring to FIG. 10, locations of the data link line DLL and the touch link line TLL, that is layers, in a non-active area NA of the display panel 110, can be identified.

Referring to FIG. 10, a plurality of data link lines DLL and a plurality of touch link lines TLL in the non-active area NA may be made of different materials from each other. That is to say, a plurality of data link lines DLL and a plurality of touch link lines TLL in the non-active area NA may be located in different material layers from each other.

Exemplary aspects will be described with reference to FIG. 10.

In the non-active area NA, a plurality of data link lines DLL may be located in the first conductive material layer M1 of the first conductive material. A plurality of touch link lines TLL may be located in the second conductive material layer M2 of the second conductive material.

In this case, for example, the first conductive material may be a gate material. The second conductive material may be a source-drain material.

In the non-active area, both a plurality of data link lines DLL and a plurality of touch link lines TLL NA may be located beneath the planarization layer PAC.

According to the above-described structures and/or configurations, it is possible to prevent a short-circuit between the data link lines DLL and the touch link lines TLL in the non-active area NA.

Meanwhile, referring to FIGS. 9 and 10, a plurality of touch link lines TLL disposed in the non-active area NA may be the same material as a plurality of data lines DL disposed in the active area AA.

For example, a plurality of touch link lines TLL disposed in the non-active area NA and a plurality of data lines DL disposed in the active area AA may be the second conductive material, such as a source-drain material, or the like.

As described above, since different types of signal lines, such as DL. TLL, or the like, are made of the same type of material and are disposed in different areas AA and NA, the types of materials used in the display panel 110 can be reduced.

Referring to a sectional view of FIG. 11, in the display panel 110, a connection configuration (connection structure) between the touch line TL disposed in the active area AA and the touch link line TLL disposed in the non-active area NA can be identified.

Referring to FIG. 11, a plurality of touch lines TL disposed in the active area AA and a plurality of touch link lines TLL disposed in the non-active area NA may be different materials from each other. That is, a plurality of touch lines TL disposed in the active area AA and a plurality of touch link lines TLL disposed in the non-active area NA may be different material layers from each other.

For example, a plurality of touch lines TL disposed in the active area AA may be the third conductive material, such as a molybdenum metal, and a plurality of touch link lines TLL disposed in the non-active area NA may be the second conductive material, such as a source-drain material. That is, a plurality of touch lines TL disposed in the active area AA may be located in the third conductive material layer M3, and a plurality of touch link lines TLL disposed in the non-active area NA may be located in the second conductive material layer M2.

Referring to FIG. 11, a plurality of touch lines TL may be located on the planarization layer PAC. As an aspect, a plurality of touch link lines connected to a plurality of touch lines may be located beneath the planarization layer PAC.

In other words, signal lines TL and TLL, related to the touch driving, disposed in the display panel 110, may be located on the planarization layer PAC in the active area AA, but may be located beneath the planarization layer PAC in the non-active area NA.

Since the signal lines, such as the touch lines TL, related to the touch driving are disposed on the planarization layer PAC in the active area AA, and the signal lines, such as the touch link lines, related to the touch driving are deeply disposed beneath the planarization layer PAC in the non-active, it is possible to prevent the signal lines, such as the touch link lines TLL, related to the touch driving in the non-active area NA from an external impact occurring on the non-active area (NA), without deteriorating touch sensitivity in the active area in which a touch occurs.

Referring to FIG. 11, the touch lines TL of the third conductive material may be connected to the touch link lines TLL of the second conductive material through a jumping pattern JUMP corresponding to the connection pattern CPt of the fourth conductive material.

In this case, a part of the jumping pattern JUMP may be connected to the touch lines TL through the contact hole CNT2a of the second protective layer PAS2, and another part of the jumping pattern JUMP may be connected to the touch link lines TLL through the contact hole CNT2n of the first and second protective layers PAS1 and PAS2, the planarization layer APC and the buffer layer BUF.

Figure 12:
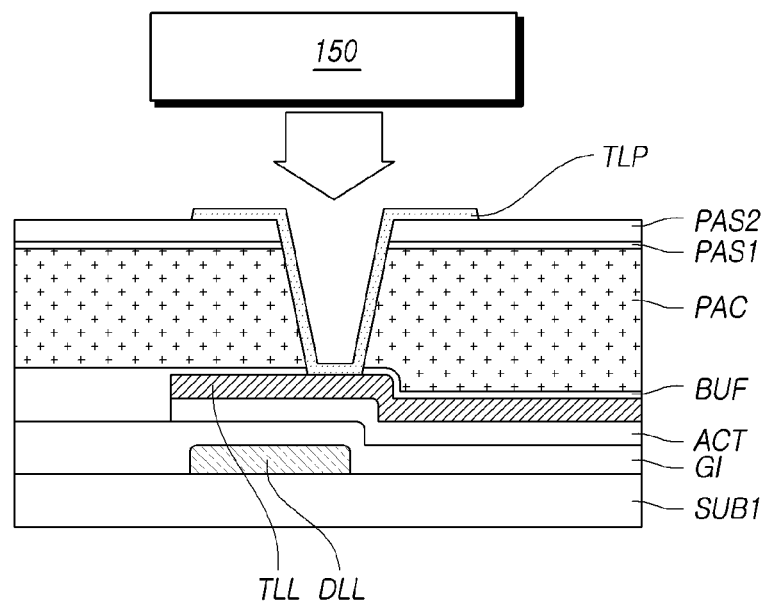
FIG. 12 is a view illustrating a connection configuration (connection structure) in which a touch driving circuit is connected to a plurality of touch link lines in the non-active area of the display panel of the touch-sensitive display device according to aspects of the present disclosure.

FIG. 12 is a view illustrating a connection configuration (connection structure) between the touch link lines TLL and the touch driving circuit 150 in the non-active area NA of the display panel 110 of the touch-sensitive display device 100 according to some aspects of the present disclosure, and a sectional view of a TBA area of FIG. 6.

Referring to FIG. 12, in the non-active area NA, the touch driving circuit 150 may electrically connected to a plurality of touch link line TLL of the second conductive material through a touch connection pattern TLP of the fourth conductive material. In this case, the touch connection pattern TLP may be a touch pad TP or a pattern connected to the touch pad TP.

According to the above description, the touch link line TLL deeply located beneath the planarization layer PAC may be effectively connected to the touch driving circuit 150.

Figure 13:
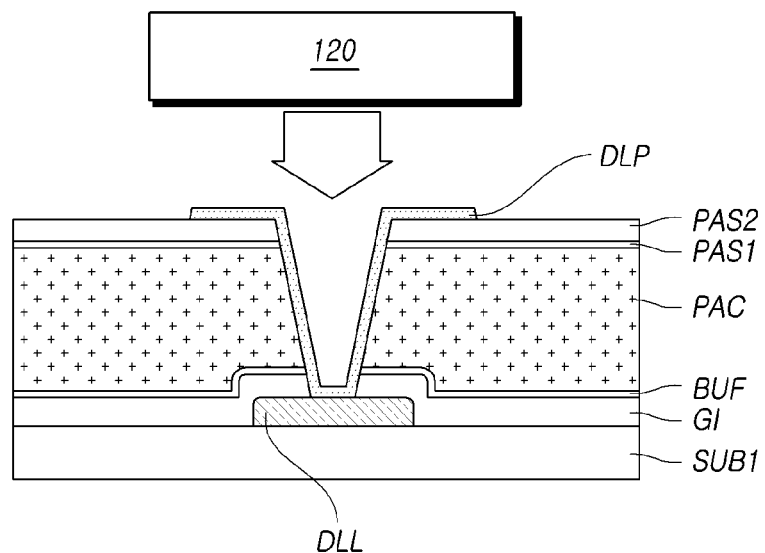
FIG. 13 is a view illustrating a connection configuration (connection structure) in which a data driving circuit is connected to a plurality of data link lines in the non-active area of the display panel of the touch-sensitive display device according to aspects of the present disclosure.

FIG. 13 is a view illustrating a connection configuration (connection structure) between the data link lines DLL and the data driving circuit 120 in the non-active area NA of the display panel 110 of the touch-sensitive display device 100 according to some aspects of the present disclosure, and a sectional view of a DBA area of FIG. 6.

Referring to FIG. 13, in the non-active area NA, the data driving circuit 120 may electrically connected to a plurality of data link lines DLL of the first conductive material through a data connection pattern DLP of the fourth conductive material. In this case, the data connection pattern DLP may be a data pad DP or a pattern connected to the data pad DP.

According to the above description, the data link lines DLL deeply located beneath the planarization layer PAC may be effectively connected to the data driving circuit 120.

Hereinafter, in order to describe the effect resulted from the configurations on the signal lines, such as DL, DLL, TL, TLL, or the like, related to data driving and touch driving as described above, description will be given assuming that the display panel 110 is a liquid crystal display panel.

Figure 14:
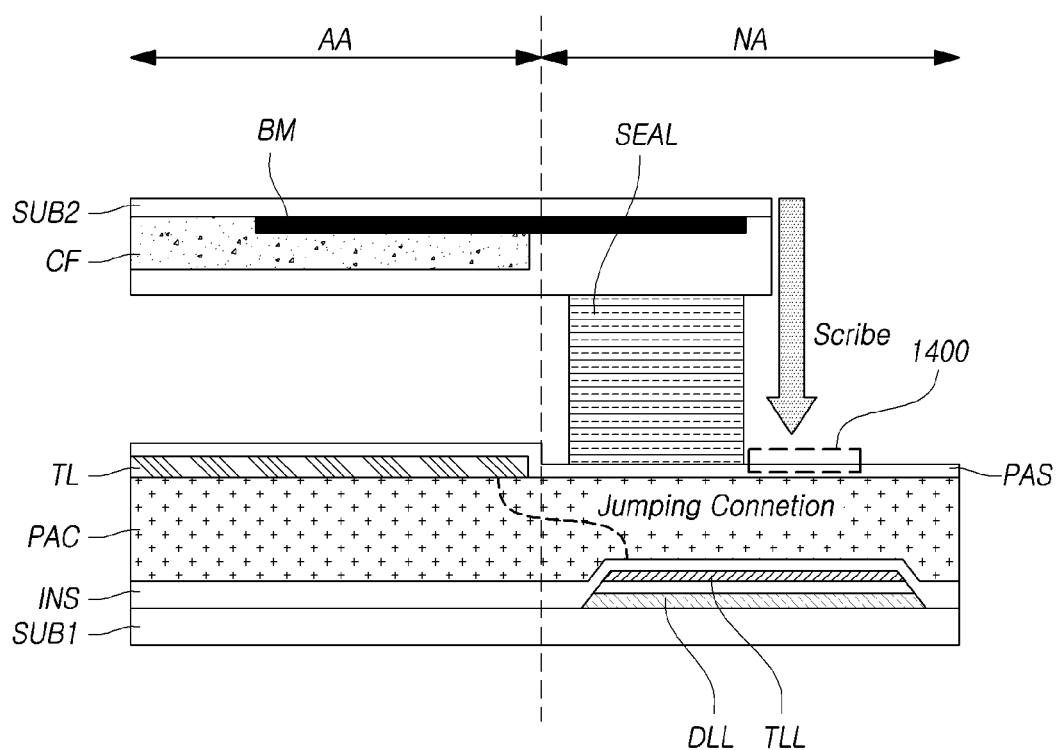
FIG. 14 is a cross-sectional view illustrating a scribing process during a fabricating process of the display panel according to aspects of the present disclosure.

FIG. 14 is a schematic cross-sectional view illustrating a scribing process during a fabricating process of the display panel 110 according to aspects of the present disclosure. FIG. 14 is, as a cross-sectional view of FIG. 5, a view schematically illustrating a layer structure in which, for convenience of description, the integrated circuit 500 is omitted and the touch line TL and the touch link line TLL are disposed in respective layers.

Referring to FIG. 14, the display panel 110 according to aspects of the present disclosure may include a first substrate SUB1 and a second substrate SUB2 facing the first substrate SUB1. In this case, the first substrate SUB1 may be a substrate of a thin film transistor (TFT), and the second substrate SUB2 may be a color filter substrate on which a color filter CF, a black matrix BM, and the like are located.

The first substrate SUB1 on which various electrodes, wirings, and transistors are disposed and the second substrate SUB2 on which the color filter CF, the black matrix BM and the like are formed are bonded together by a sealant SEAL.

The first substrate SUB1 may extend beyond the second substrate SUB2.

A touch electrode TE to which a touch driving signal is applied and a touch line TL connected to the touch electrode may be disposed in the active area AA of the first substrate SUB1.

A touch link line TLL electrically connecting the touch line TL to a touch pad may be disposed in the non-active area NA which is an outer area of the active area AA of the first substrate SUB1.

The touch link lines TLL and the touch lines TL may be made of different materials from each other. That is, the touch link lines TLL and the touch lines TL may be located in different material layers from each other, and electrically connected to each other through a jumping pattern JUMP.

A planarization layer PAC may be located on the first substrate SUB1. The touch line TL may be disposed on the planarization layer PAC in the active area AA, and the touch link line TLL may be disposed beneath the planarization layer PAC in the non-active area NA.

Meanwhile, when the first and second substrates SUB1 and SUB2 are bonded together to provide the display panel 110, a scribe process is performed on the second substrate SUB2, and, at this time, there is a high possibility that scratches will occur in an upper portion 1400 of the planarization layer PAC on the first substrate SUB1 in the non-active area NA.

Nevertheless, according to the above layers, lines and arrangements, since the touch link line TLL is deeply located beneath the planarization layer PAC in the non-active area NA, when the display panel is fabricated, even if scratches occur in the upper portion 1400 of the planarization layer PAC on the first substrate SUB1 in the non-active area NA, the touch link line TLL is prevented from being broken or damaged.

In other words, at the location of the scribe process, the touch link line TLL corresponding to a wiring member (wiring structure) for transferring a touch signal may not be located in the upper part 1400 of the planarization layer PAC on the first substrate SUB1, and be located beneath the planarization layer PAC on the first substrate SUB1. Accordingly, when the scribe process is performed, the touch link line TLL corresponding to the wiring member (wiring structure) for transferring the touch signal is prevented from being in short-circuit state or damaged.

Meanwhile, a data link line DLL electrically connected to a data line DL disposed in the active area AA may be disposed in the non-active area NA.

Such a data link line DLL may be located beneath the touch link line TLL.

Meanwhile, the touch link line TLL may be made of different material from the touch line TL, but the same material as the data line DL. The touch link line TLL may be made of the same material as the data line DL, but different material from the data line DLL.

For example, the touch link line TLL located beneath the planarization layer PAC in the non-active area NA may be a second conductive material corresponding to a source-drain material, and the data link line DLL located at lower vertical height than the touch link line TLL may be a first conductive material corresponding to a gate material.

According to the various aspects of the present disclosure, it is possible to provide a touch-sensitive display device and a display panel having the wiring configuration (wiring structure) capable of preventing wired lines from being broken or damaged, related to the touching sensing.

According to the various aspects of the present disclosure, since the touch link line TLL for electrically connecting the touch line TL disposed in the active area AA to the touch driving circuit 150 disposed in the non-active area NA is disposed in non-active area NA, and, at the same time, the touch link line TLL disposed in the non-active area is deeply disposed under the planarization layer PAC, it is possible to provide the touch-sensitive display device 100 and the display panel 110 having a link configuration (link structure) in which the touch link line TLL in the non-active area NA is prevented from being broken or damaged, by the scribe process being performed when the display panel is fabricated.

According to the various aspects of the present disclosure, it is possible to provide the touch-sensitive display device and the display panel having a stacked structure capable of preventing defects of signal lines used for data driving and touch driving (touch sensing), such as TL, DL, TLL, DLL, or the like, in spite of the limitations on the types of wiring materials.

The location or disposition of any pattern, such as various electrodes, various wiring, or the like, on or beneath a first substrate SUB1, a layer, or the like, as described above, means that the pattern may be located or disposed in contact with the top or bottom surface of the first substrate SUB1 or the layer, or the like, or the pattern may be on or beneath one or more other layers located or disposed above or below the first substrate SUB1, the layer, or the like. The features, structures, configurations, and effects described in the present disclosure are included in at least one aspect but are not necessarily limited to a particular aspect. A person skilled in the art can apply the features, structures, configurations, and effects illustrated in the particular aspect aspects to another one or more additional aspect aspects by combining or modifying such features, structures, configurations, and effects. It should be understood that all such combinations and modifications are included within the scope of the present disclosure. Although the exemplary aspects have been described for illustrative purposes, a person skilled in the art will appreciate that various modifications and applications are possible without departing from the essential characteristics of the present disclosure. For example, the specific components of the exemplary aspects may be variously modified. The various aspects described above can be combined to provide further aspects. These and other changes can be made to the aspects in light of the above-detailed description. In general, in the following claims, the terms used should not be construed to limit the claims to the specific aspects disclosed in the specification and the claims, but should be construed to include all possible aspects along with the full scope of equivalents to which such claims are entitled. Accordingly, the claims are not limited by the disclosure.

What is claimed is:

1. A display device comprising:
    a first substrate including an active area displaying an image and a non-active area disposed an outside area of the active area;
    a second substrate facing the first substrate;
    a plurality of gate lines and a plurality of data lines which define at least one pixel by intersecting each other on the first substrate;
    a plurality of touch electrodes overlapping with the at least one pixel in the active area on the first substrate;
    a plurality of touch lines electrically connected to the plurality of touch electrodes;
    a data driving circuit disposed in or electrically connected to the non-active area on the first substrate and driving the plurality of data lines;
    a touch driving circuit driving the plurality of touch electrodes;
    a plurality of data link lines disposed in the non-active area on the first substrate and electrically connecting the plurality of data lines to the data driving circuit;

a plurality of touch link lines disposed in the non-active area on the first substrate and electrically connecting the plurality of touch lines to the touch driving circuit;
a planarization layer disposed on the plurality of touch link lines and the plurality of data link lines; and
a data connection pattern electrically connecting the data driving circuit to the plurality of data link lines,
wherein the plurality of touch lines and the plurality of touch link lines are formed of different conductive materials,
wherein the plurality of data lines is located over the plurality of gate lines,
wherein the plurality of touch lines is located over the planarization layer on the plurality of data lines and the plurality of touch link lines, and
wherein the plurality of touch lines and the plurality of touch link lines are electrically connected through through-holes in the planarization layer disposed in the active area and the non-active area.

2. The display device according to claim 1, wherein the plurality of touch link lines and the plurality of data lines are formed of a same material.

3. The display device according to claim 1, wherein the plurality of data lines and the plurality of touch lines in the active area are formed of different conductive materials.

4. The display device according to claim 1, wherein the plurality of data link lines and the plurality of touch link lines in the non-active area are formed of different conductive materials.

5. The display device according to claim 1, wherein the planarization layer is disposed between the plurality of touch lines and the plurality of data lines or the plurality of touch lines and the plurality of touch link lines.

6. The display device according to claim 5, wherein the plurality of gate lines and the plurality of data link lines are formed of a first conductive material,
the plurality of data lines is formed of a second conductive material,
the plurality of touch lines is formed of a third conductive material, and
the plurality of touch link lines is formed of the second conductive material.

7. The display device according to claim 6, further comprising a jumping pattern disposed in the through-hole in the planarization layer and electrically connecting the plurality of touch lines to the plurality of touch link lines.

8. The display device according to claim 7, wherein the jumping pattern includes a fourth conductive material different from the first, second and third conductive materials.

9. The display device according to claim 6, further comprising a touch connection pattern disposed on the plurality of touch lines and electrically connecting the touch driving circuit to the plurality of touch link lines.

10. The display device according to claim 9, wherein the touch connection pattern includes a fourth conductive material different from the first, second and third conductive materials.

11. The display device according to claim 1, wherein the data connection pattern includes a fourth conductive material different from the first, second and third conductive materials.

12. The display device according to claim 1, wherein the data driving circuit and the touch driving circuit are integrated in an integrated circuit.

13. A display panel comprising:
a plurality of data lines disposed in an active area;
a plurality of touch electrodes disposed in the active area;
a plurality of touch lines disposed in the active area and electrically connected to the plurality of touch electrodes;
a plurality of data link lines disposed in a non-active area which is an outer area of the active area and electrically connected to the plurality of data lines;
a plurality of touch link lines disposed in the non-active area and electrically connected to the plurality of touch lines;
a planarization layer disposed between the plurality of touch link lines and the plurality of touch lines; and
a data connection pattern electrically connecting the data driving circuit to the plurality of data link lines,
wherein the plurality of touch lines and the plurality of touch link lines are formed of different conductive materials,
wherein the plurality of data lines is located over the plurality of gate lines,
wherein the plurality of touch lines is located over the planarization layer on the plurality of data lines and the plurality of touch link lines, and
wherein the plurality of touch lines and the plurality of touch link lines are electrically connected through through-holes in the planarization layer disposed in the active area and the non-active area.

14. The display panel according to claim 13, wherein the planarization layer is disposed between the plurality of touch link lines and the plurality of touch lines.

15. The display panel according to claim 13, wherein the plurality of touch link lines in the non-active area is formed of a same material as the plurality of data lines disposed in the active area.

16. The display panel according to claim 13, wherein the plurality of data lines and the plurality of touch lines in the active area are formed of different conductive materials.

17. The display panel according to claim 13, wherein the plurality of data link lines and the plurality of touch link lines disposed in the non-active area are formed of different conductive materials.

18. A display panel comprising:
a plurality of touch electrodes disposed in an active area;
a plurality of touch lines disposed in the active area and electrically connected to the plurality of touch electrodes;
a plurality of data link lines disposed in a non-active area disposed an outside area of the active area and electrically connected to a plurality of data lines;
a plurality of touch link lines disposed in the non-active area and electrically connected to the plurality of touch lines through a jumping pattern disposed on the plurality of touch lines, and the plurality of touch lines and the plurality of touch link lines are formed of different conductive materials;
a planarization layer disposed between the plurality of touch link lines and the plurality of touch lines;
a data connection pattern electrically connecting the data driving circuit to the plurality of data link lines; and
a touch driving circuit disposed in the non-active area and driving and sensing a touch panel and electrically connected to the plurality of touch link lines through a touch connection pattern disposed on the plurality of touch lines,
wherein the plurality of data lines is located over the plurality of gate lines,
wherein the plurality of touch lines is located over the planarization layer on the plurality of data lines and the plurality of touch link lines, and wherein the plurality of touch lines and the plurality of touch link lines are electrically connected through through-holes in the planarization layer disposed in the active area and the non-active area.

19. The display device according to claim 18, wherein the data connection pattern includes a fourth conductive material different from a first conductive material forming a plurality of gate lines, a second conductive material forming the plurality of data lines and a third conductive material forming the plurality of touch lines.

20. The display panel according to claim 18, wherein the planarization layer is disposed between the plurality of touch link lines and the plurality of touch lines.

21. The display panel according to claim 18, wherein the plurality of touch link lines in the non-active area is formed of a same material as the plurality of data lines disposed in the active area.

22. The display panel according to claim 18, wherein the plurality of data lines and the plurality of touch lines in the active area are formed of different conductive materials.

23. The display panel according to claim 18, wherein the plurality of data link lines and the plurality of touch link lines disposed in the non-active area are formed of different conductive materials.

* * * * *